United States Patent
Xue et al.

(10) Patent No.: US 7,505,534 B1
(45) Date of Patent: Mar. 17, 2009

(54) METHOD FOR DETERMINATION OF DISCONTINUOUS TRANSMISSION, FRAME ERASURE, AND RATE

(75) Inventors: Guoqiang Xue, Nepean (CA); Xixlan Chen, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 789 days.

(21) Appl. No.: 10/690,604

(22) Filed: Oct. 23, 2003

Related U.S. Application Data

(60) Provisional application No. 60/423,895, filed on Nov. 4, 2002.

(51) Int. Cl.
*H03D 1/00* (2006.01)
(52) U.S. Cl. ........... 375/340
(58) Field of Classification Search ........ 375/340, 375/341
See application file for complete search history.

(56) References Cited

U.S. PATENT DOCUMENTS

| | | | |
|---|---|---|---|
| 5,751,725 A * | 5/1998 | Chen | 714/708 |
| 5,774,496 A * | 6/1998 | Butler et al. | 375/225 |
| 6,094,465 A | 7/2000 | Stein et al. | |
| 6,370,392 B1 | 4/2002 | Li et al. | |
| 6,888,901 B2 * | 5/2005 | Yu et al. | 375/341 |
| 2002/0159423 A1 * | 10/2002 | Yao et al. | 370/342 |
| 2003/0007577 A1 * | 1/2003 | Shiu et al. | 375/341 |
| 2003/0043487 A1 * | 3/2003 | Morita et al. | 360/25 |
| 2005/0053040 A1 * | 3/2005 | Choi et al. | 370/335 |

OTHER PUBLICATIONS

Zhai, F. et al., "Techniques for Early Stopping and Error Detection in Turbo Decoding", IEEE Transactions on Communications, vol. 51, No. 10, Oct. 2003, pp. 1617-1623.

* cited by examiner

*Primary Examiner*—Kevin Y Kim
(74) *Attorney, Agent, or Firm*—Ann Kinsman; Borden Ladner Gervais LLP

(57) ABSTRACT

This invention enables determining whether a received frame is an erasure, a DTX mode frame or a CONT mode frame, using a metric m derived from the log likelihood ratio (LLR). The new metric is obtained by calculating the mean for the LLRs for a frame; a threshold T for this metric is also established. A received frame is declared a CONT frame if the CRC value indicates a successfully recovered frame, and m>T. A received frame is a DTX frame if m<T. Finally, a frame is declared an erasure if the CRC value indicates a failed frame, and m>T. The mean absolute LLR may also be used for determining the transmission rate of the system. In this case, a voice frame is decoded for all rates available; the transmission rate is that which corresponds to a passed CRC and has the highest m.

14 Claims, 3 Drawing Sheets

METHOD FOR DETERMINATION OF DISCONTINUOUS TRANSMISSION, FRAME ERASURE, AND RATE

RELATED APPLICATION

This application claims the benefit of provisional patent application Ser. No. 60/423,895 filed 4 Nov. 2002.

FIELD OF THE INVENTION

The present invention is directed to radio communications systems, and more particularly to a method for identifying a discontinuous transmission mode, frame erasure and transmission rate.

BACKGROUND

Modern wireless systems using wideband multiple access technologies such as wideband CDMA (code division multiple access), referred to as W-CDMA or CDMA2000, are expected to effectively handle large variety of services, such as voice and data services. Examples of data services include short message service (SMS), multimedia message service (MMS), web browsing, online gaming, etc. Often, these latter services may require that data be transmitted at a rate much higher than that required for voice transmission.

The link between a mobile user station (MU) and a base transceiver station (BTS) in a CDMA system is a multiple radio access channel, where users share the same physical radio channel (i.e. the signals transmitted by an MU occupy the same bandwidth as the signals transmitted by other MUs in the respective cell), each MU being uniquely identified by a spreading code. To support various end user services, an MU transmitter divides this physical channel in sub-channels. One sub-channel (the pilot sub-channel) is used to manage the air interface resources and enables the BTS to keep track of the mobile terminals currently under its control. The remaining sub-channels are used for traffic and traffic control. More particularly, a fundamental sub-channel (FCH) is used for voice traffic, a supplemental sub-channel (SCH) is used for data traffic, and a control channel (DCCH) for signalling and synchronization.

The requirements for voice and data transmissions are different in many respects: the voice signals must be processed substantially in real-time, while the data signals can tolerate some degree of delayed operation. To accommodate the bursty nature of the high-speed data services, it is necessary to assign a large data bandwidth to the respective call for the duration of the data burst.

Using the reverse link (from the MU to BTS) as an example, a mobile terminal starts transmitting when it has gathered enough data, and keeps idle when the transmission is over. When a data transmission is required, an MU is immediately assigned a SCH. It is useful to know when a burst transmission is over to optimize the bandwidth usage.

For data services, or any other services in which the transmissions are infrequent bursts, the base station may lose synchronization with its mobile terminals. Several methods have been proposed to avoid the loss of synchronization at the base transceiver station.

One method, known as a continuous mode of operation (CONT) scheme, proposes that the MU transmits continuously a low bit rate control signal to the BTS between data bursts, so that the base station could maintain synchronization with the terminal between data bursts. The CONT scheme requires reservation of an uplink channel decoding resources for each MU engaged in bursty data transmission; these resources cannot be used by any other mobile terminal and cannot be used when the assigned mobile terminal ceased transmitting. Additionally, the receiver on the base station must remain active at all times.

Another method, known as the discontinuous transmission medium access control (DTX) scheme, proposes to discontinue the transmission from the individual mobile terminals during the off-periods, and to share the freed BTS receiver decoding resources among different users. While the DTX scheme may achieve considerable savings in base station equipment, it requires transmitting a synchronization message at the beginning of each on-period to allow the base station to acquire synchronization with the transmitting mobile terminal. The synchronization message also serves to inform the base station that a particular mobile terminal intends to transmit.

Most CDMA systems are provided with both schemes. As a result, there is a need to provide the base station receiver with means to determine precisely whether the mobile operates in a continuous (CONT) transmission mode, or in a discontinuous transmission (DTX) mode. In addition, in a CONT scheme when the receiver decides that a received frame is in error, it erases the frame. The MU has to determine the number of erasure frames that were erased (erasure frames). Also, it is important for the receiver to determine if the transmitted frame has been erased due to certain conditions on the air link, or due to the transmission being discontinued. An incorrect determination of erasure frames will trigger unnecessary signalling (and occupy valuable bandwidth) between the MU and the BTS, and will also result in an unnecessary increase in the power level fluctuation.

A method to identify a DTX mode used currently is to decode a supplemental channel frame, and then encode a frame worth of the decoded bits, in the same manner as performed by the transmitter. The encoded symbols are then correlated with the decoder input. The correlation result is used as a metric and compared with a threshold to determine whether there is a frame transmitted, and whether the frame was received correctly. This method improves the DTX mode detection reliability for convolutional code systems, but not for turbo code systems, since the turbo decoder operates at a lower signal to noise ratio as compared to a Viterbi decoder, commonly used in decoding convolutional codes. In addition, use of the re-encoding and correlation introduce a considerable amount of computations.

Another method employed currently for identifying a DTX mode is to measure the transmitted and received power ratio of a pilot channel to the supplemental channel. A DTX mode is recognized if the power ratio is greater than a threshold. However, this method is not reliable for the convolutional code system or the turbo code system due to relatively low signal to noise ratio.

In CDMA2000 systems, voice is transmitted in the fundamental channel. To reduce interference and thus increase system capacity, variable data rate voice encoding technique is used. The voice encoder (vocoder) outputs the highest data rate (called full rate) when there is a full voice activity, and the lowest data rate (⅛th rate) when it detects silence. There are also other two intermediate rates, i.e., half rate and quarter rate for voice data rate transition. The voice data rate information is not explicitly sent. The base station and mobile receivers have to detect precisely the rate of the incoming voice frame. Incorrect rate determination results in annoying audible noise.

SUMMARY OF THE INVENTION

It is an advantage of the invention to alleviate totally or in part the disadvantages of the prior art solutions. Another advantage of the invention is to provide a method for detection of a DTX mode of operation and frame erasure when turbo codes are used. Still another advantage of the invention to provide a method for detection of transmitted voice rate when variable rate voice vocoder is used.

It is an advantage of the invention to provide a method, in a wireless system, for determining whether a received frame is an erasure, a DTX mode frame or a CONT mode frame comprising: decoding said frame to obtain a log likelihood ratio (LLR) $\Lambda(n)$, reflecting the likelihood that a detected symbol is a logic "1" or a logic "0"; computing a mean absolute LLR value m for said received frame; calculating a CRC value for said received frame; and determining whether said received frame is an erasure, a DTX mode frame or a CONT mode frame based on said CRC value and said mean absolute LLR value.

It is an advantage of the invention to provide a method of detecting the transmission rate of a voice frame in a wireless system comprising: decoding said voice frame for each of a plurality i of possible transmission rates j(i); for each said j(i) rate, computing a CRC(i) value and a mean absolute LLR value m(i); and determining the transmission rate based on said mean absolute LLR value and said CRC value for said voice frame.

It is an advantage of the invention to provide a receiver for a wireless communication system for recovering information transmitted in a frame, comprising: means for decoding a received frame to obtain a log likelihood ratio (LLR) $\Lambda(n)$ value reflecting the likelihood that a detected symbol s(n) is a logic "1" or a logic "0"; means for computing a mean absolute LLR value m for said received frame; means for calculating a CRC value for said received frame; and means for determining whether said received frame is an erasure, a DTX mode frame or a CONT mode frame based on the CRC value and said mean absolute LLR value.

Typically DTX performance is evaluated in terms of the two probabilities:

P(E|D)=probability of declaring an erasure event when a DTX event occurred

P(D|E)=probability of declaring a DTX event when an erasure event occurred

Advantageously, the receiver according to the invention obtains very low probabilities of P(E|D) and P(D|E) simultaneously.

DETAILED DESCRIPTION OF THE PREFERRED EMBODIMENTS

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Some terms are defined next for convenience:

Each CDMA based BTS transmits a combined signal, referred to as the forward CDMA channel, and receives the combined RF outputs from a set of CDMA based MU located within an associated coverage area; the combined outputs are referred to as the reverse CDMA channel.

The forward CDMA channel is the sum of the forward pilot channel, the forward synchronization channel, one or more forward paging channels, and many forward user traffic channels that are each modulated with a distinct channel code (Walsh code) and are spread with a PN (pseudo-noise) spreading sequence.

The reverse CDMA channel is the sum of one or more reverse access channels and many reverse user traffic channels that are each modulated with a unique PN spreading sequence.

As indicated above, unlike voice traffic, the data traffic transported on a supplemental channel is bursty in nature. The present invention enables the receiver at the BTS (base transceiver station) to determine if the mobile is transmitting on the supplemental channel in case of a discontinuous transmission (DTX). As well, the invention enables the BTS to determine if a frame is decoded correctly. A metric called "mean absolute LLR" is introduced in this specification. LLR is the logarithmic likelihood ratio or (log-likelihood ratio), which reflects the probability that a symbol is a logical "1" or a logical "0". When combined with the cyclic redundancy check (CRC), the new metric is very reliable in determining the DTX mode, CONT mode and frame erasure.

For voice application, the present invention enables the receiver at the BTS to determine the voice rate if the mobile is transmitting on the fundamental channel. A mean absolute LLR is calculated for each rate along with the CRC check. For the rate with maximum mean absolute LLR, if its CRC passes, the rate is declared as the mobile transmitted rate; other wise, the frame is declared as an erasure.

So far our discussion is focused on the BTS side. The invention can also be applied to mobile station receiver.

Figure 1A:
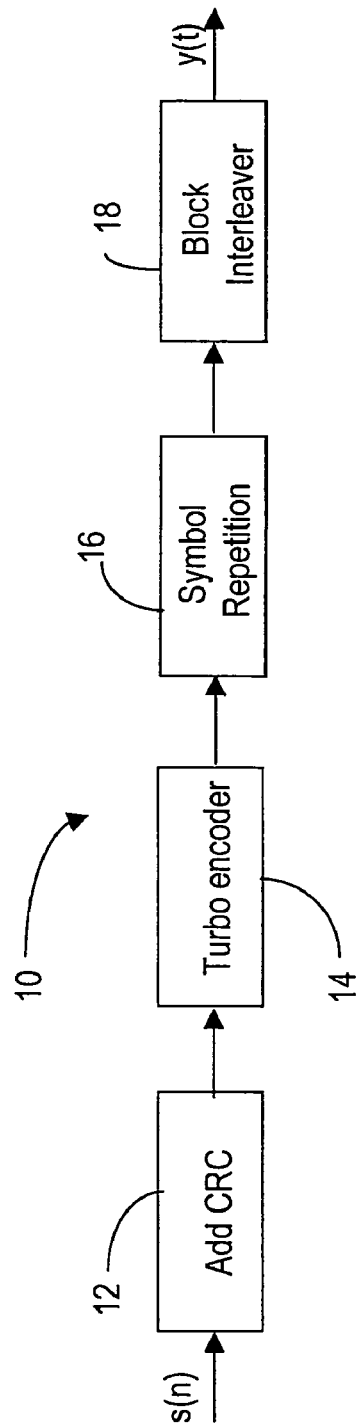
FIG. 1A shows a the block diagram of a baseband transmitter with a turbo encoder

FIG. 1A shows a baseband transmitter 10 with a turbo encoder 14. The transmitter of FIG. 1A maps every N bits of information data s(n) into a frame. In the meantime, M CRC bits are calculated and added to the frame in CRC block 12 before the frame is input to the turbo encoder 14. If we denote the turbo encoder rate with R, the output of the turbo encoder will have a frame size (N+M)/R. The turbo-encoded frame is then repeated, shown by symbol repetition block 16. Finally, a block interleaver 18 randomizes blocks of samples into a frame to make the output turbo code signal y(t) more robust in a fading environment.

Figure 1B:
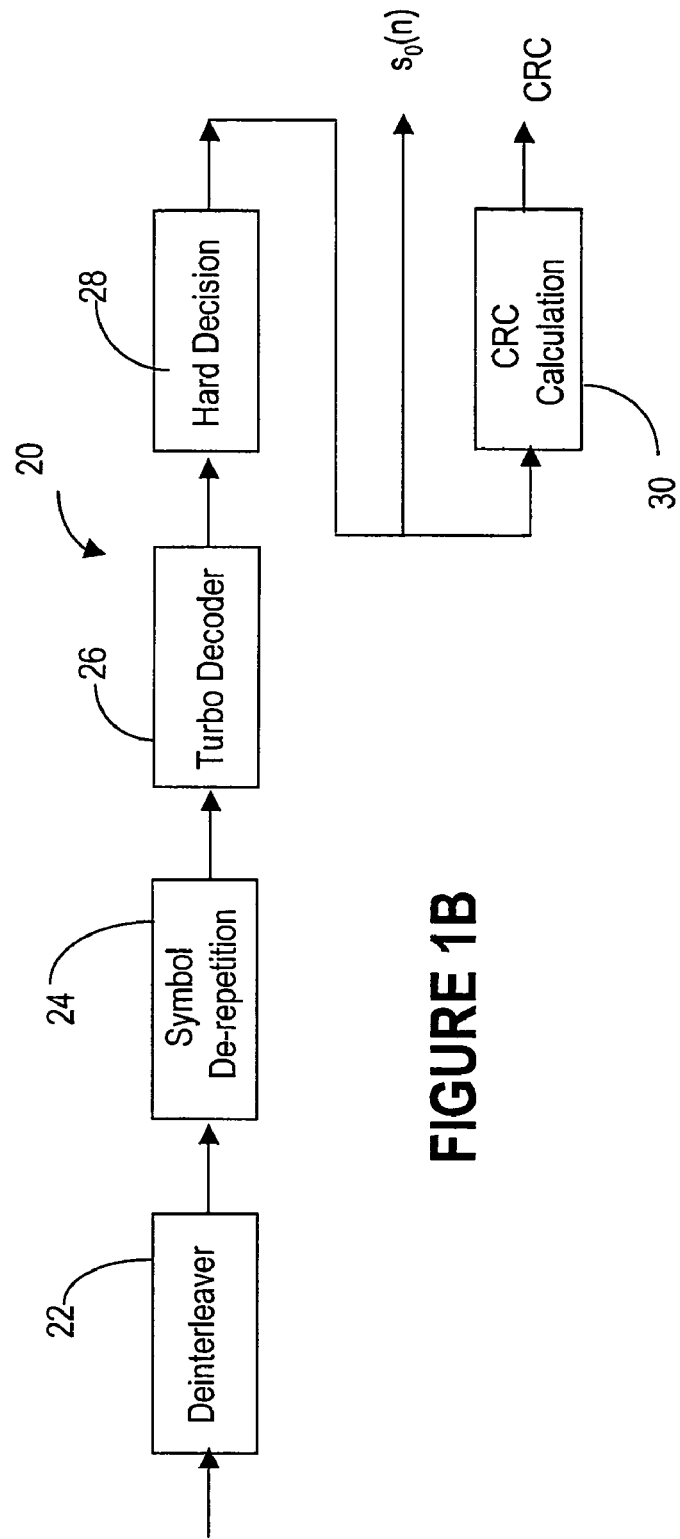
FIG. 1B illustrates a baseband receiver with a turbo decoder.

The receiver 20 shown in FIG. 1B performs the reverse processing on signal y(t), after it suffers the impairments of the air interface. The received signal is de-interleaved in block 22 and de-repeated in block 24. A turbo decoder 26 decodes the signal at the output of block 24, and provides (N+M) LLRs for each frame, denoted with Λ(n). A hard decision block 28 recovers the signal using the LLR, and block 30 calculates the CRC (cyclic redundancy check).

Figure 2:
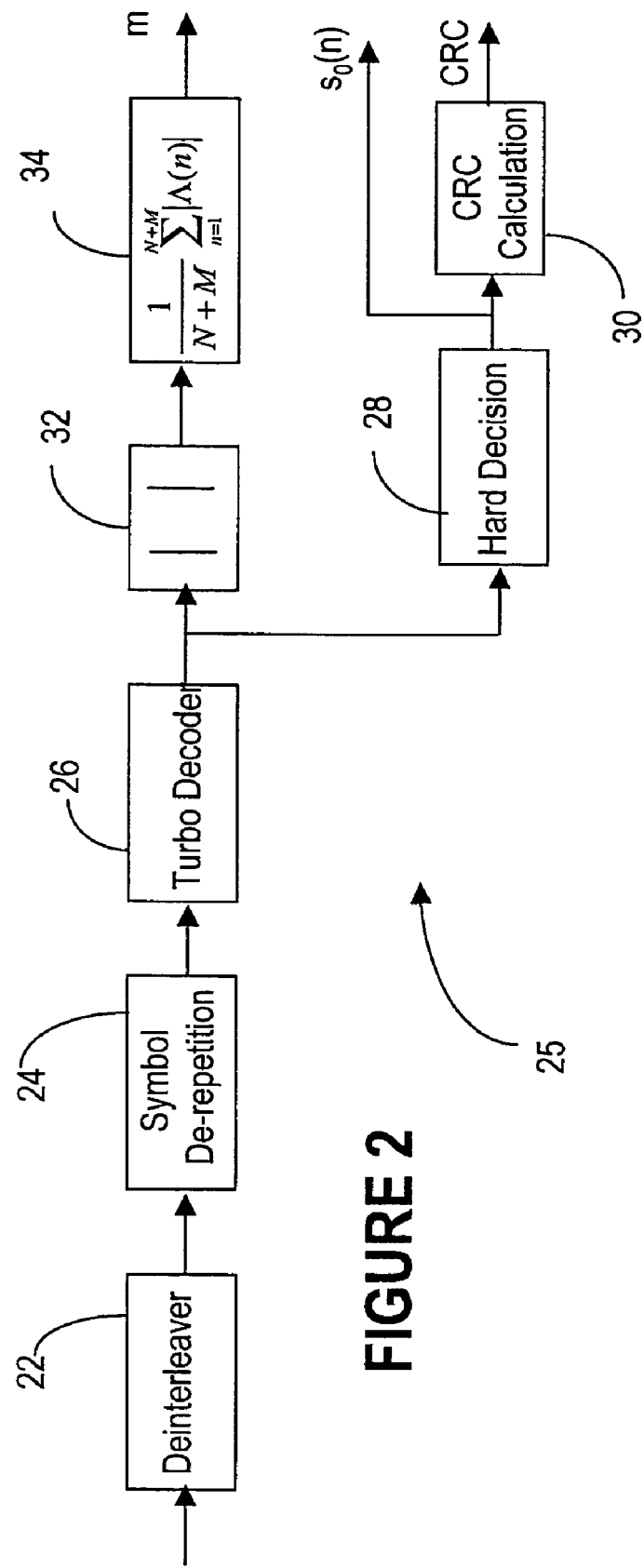
FIG. 2 is a block diagram of a receiver with DTX and CONT detection capability according to the invention.

FIG. 2 illustrates a block diagram of a receiver 25 with DTX and CONT detection capability according to the invention. The mean absolute log-likelihood ratio m is defined in EQ 1 as the mean absolute value of all LLRs over a frame.

$$m = \frac{1}{N+M} \sum_{n=1}^{N+M} |\Lambda(n)| \qquad \text{EQ1}$$

The receiver includes a de-interleaver 22, a symbol de-repetition block 24 and a turbo decoder 26, as in the embodiment of FIG. 1B. Block 32 at the output of the turbo decoder provides the absolute value of the (N+M) LLRs for each frame, collected on the output of the turbo decoder. The mean value calculation unit 34 receives the absolute values and calculates the mean value m for each frame. The hard decision block 28 and the CRC calculation unit 30 operate as in the embodiment of FIG. 1B to provide the recovered signal and to calculate CRC. A threshold T is also determined for the mean absolute LLR m; this threshold is determined experimentally and used as described next.

The steps of the method for determining a DTX mode according to the invention are as follows:
1. Perform turbo decoding and compute m as in EQ1 for each frame at the last iteration of the turbo decoding.
2. Make a hard decision d(n) on Λ(n). The decision rule is:

$$d(n) = 1 \text{ if } \Lambda(n) < 0 \qquad \text{EQ2}$$
$$0 \text{ otherwise}$$

3. Compute the CRC based on hard decisions {d(n), n=1, 2, ... N+M}
4. Make a CONT, DTX or frame erasure decision according to m, CRC and a threshold T, as follows:
   (a) if CRC passes, and m>T, the frame is declared as a CONT frame,
   (b) if m<T, the frame is declared a DTX frame, and
   (c) if CRC fails, and m>T, the frame is declared an erasure.

The new metrics m may also be used for determining the voice transmission rate. As mentioned previously, the voice signals are transmitted in a fundamental channel of a CDMA2000 system. The CDMA2000 system uses variable data rate voice encoding techniques in order to reduce interference and ultimately increase the system capacity. The voice encoder (vocoder) outputs the highest data rate, called full rate, when there is full voice activity, and the lowest data rate (⅛th rate of the full rate) when it detects silence. There are also two other intermediate rates, namely a half rate and a quarter rate for voice data rate transition.

However, the voice data rate information is not explicitly sent, so that the base station and mobile units have to detect precisely the rate of the incoming voice frame. Incorrect rate determination results in annoying audible noise.

Figure 3:
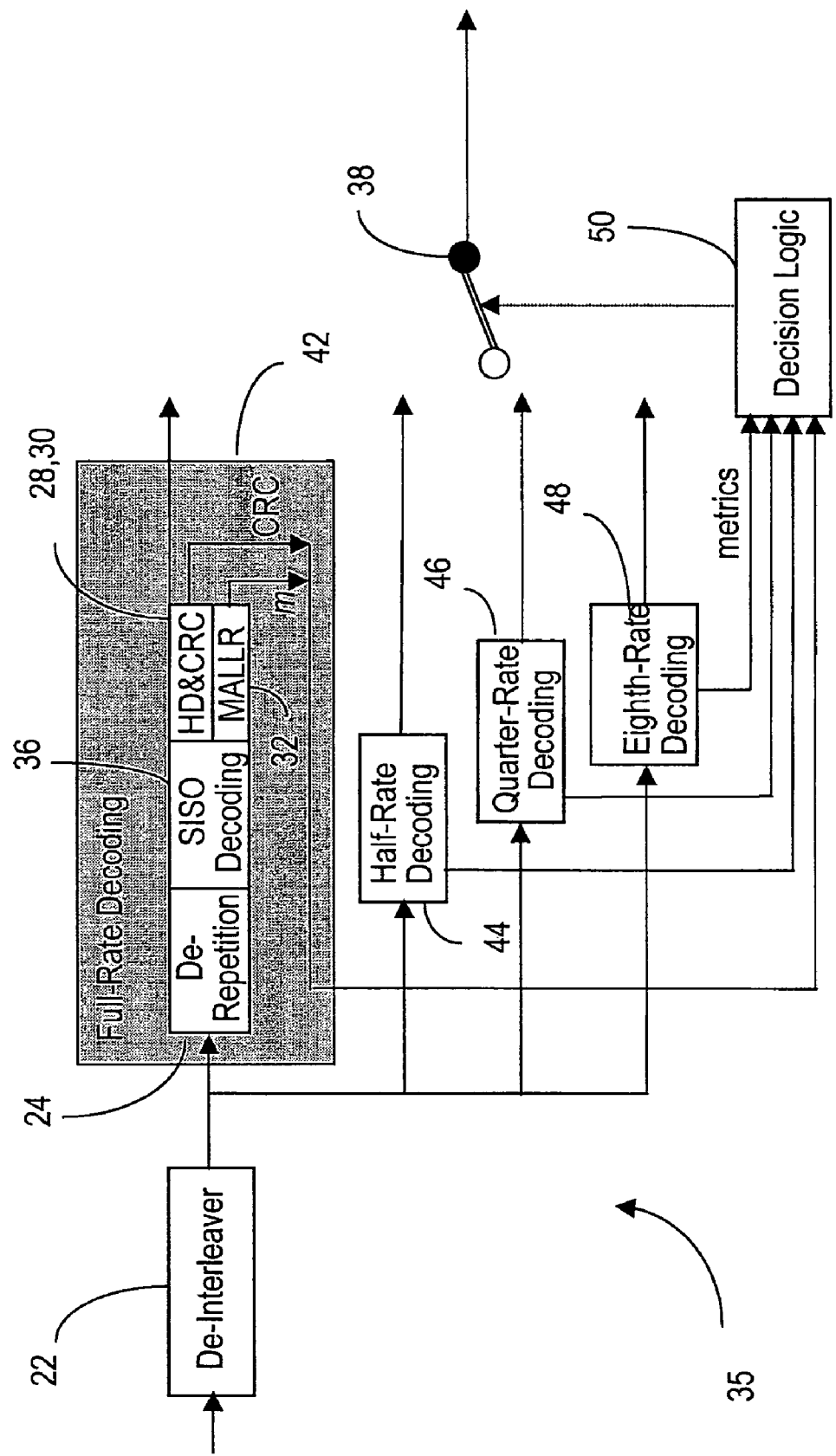
FIG. 3 illustrates a block diagram of a receiver with voice rate detection capability according to the invention.

FIG. 3 illustrates how the mean absolute LLR can be used for voice rate determination. Unlike supplemental channel, which has an option to use the turbo encoder 14, in almost all wireless communication systems voice frames are encoded using convolutional codes. Viterbi decoders, which are widely used for convolutional codes, do not provide a LLR output. In this case, the SISO (soft input soft output) decoders can provide the mean absolute log-likelihood ratio metric for voice rate determination. Examples of SISO decoders include soft output Viterbi (SOVA) decoder and MAP (Maximum A-Posteriori) decoders.

As seen in FIG. 3, decoder 35 includes as before a de-interleaver 22. The signal at the output of the de-interleaver is decoded four times, for all four rates, as shown by the full rate decoder 42, half-rate decoder 44, quarter rate decoder 46 and eighth-rate decoder 48. The decoders comprise a symbol de-repetition unit 24, an SISO decoder 36, hard decision and CRC units 28, 30 and a mean absolute LLR calculation unit 32. A decision logic block 50 analyzes the metrics output by the decoders 42, 44, 46 and 48 and establishes the rate, using the mean absolute LLR as follows:
   a) decode a voice frame four times using the SISO decoder, each time assuming that the frame has a different one of the four possible rates (full, half, quarter and $8^{th}$, identified by index i),
   b) compute a CRC for each of the four rates, denoted with j(i), where i=1, 2, 3, 4,
   c) compute m(i) using EQ 1 for each rate,
   d) determine which of the rates corresponding to the maximum m; denote this rate with R.
   e) if the CRC for R passes, then this rate is declared as the rate of the voice frame; otherwise the frame is erased.

Once the rate is known, decoder 35 will operate the corresponding unit 42, 44, 46 or 48, as intuitively shown by selector 38.

Simulations have been carried out on a reverse supplemental channel (R-SCH) with data rates j1=19.2 kbps and j2=153.6 kbps. Both signals had the same channel conditions, i.e. 2-path fading, 30 km/h mobile speed. However, the decoder parameters are slightly different, for rate j1 the turbo decoder used 10 iterations, while j2 used 5 iterations.

In the results, for both rates, the mobile transmitted 49998 SCH frames, and then stopped transmission, while the receiver continued reception for another 49998 frames.

|  | # Frames determined as CONT mode | # Frames determined as erasure | # Frames determined as DTX mode | # Frames failed the CRC test |
|---|---|---|---|---|
| 19.2 kbps 49998 transmitted in CONT mode | 47099 | 2899 | 0 | 2899 |
| 19.2 kbps, 49998 frames transmitted in DTX mode | 0 | 0 | 49998 | 49997 |
| 153.6 kbps, 49998 frames transmitted in CONT mode | 47368 | 2630 | 0 | 2630 |
| 153.6 kbps, 49998 frames transmitted in DTX mode | 0 | 0 | 49998 | 49998 |

As seen in the table above, for rate j1=19.2 kbps, with 49998 SCH frames transmitted in CONT mode, the receiver determined that 47099 frames were transmitted in CONT mode, 2899 frames were erased, 0 frames were transmitted in DTX mode, and 2899 frames failed the CRC test.

For rate j1=19.2 kbps, with 49998 SCH frames transmitted in DTX mode, the receiver determined that 0 frames were transmitted in CONT mode, 0 frames were erased, 49998 frames were transmitted in DTX mode and 49997 frames failed the CRC test.

For rate j2=153.6 kbps, with 49998 SCH frames transmitted in CONT mode, the receiver determined that 47368 frames were transmitted in CONT mode, 2630 frames were erased, 0 frames were transmitted in DTX mode and 2630 frames failed the CRC test.

Finally, for rate j2=153.6 kbps, with 49998 SCH frames transmitted in DTX mode, the receiver determined that 0 frames were transmitted in CONT mode, 0 frames were erased, 49998 frames were transmitted in DTX mode, and 49998 frames failed the CRC test.

These results indicate that the method according to the invention recognizes with high reliability a CONT/DTX mode of operation and frame erasures.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. In a wireless system, a method for determining whether a received frame is an erasure, a discontinuous (DTX) mode frame or a continuous (CONT) mode frame, comprising:
   a) decoding said frame to obtain a log likelihood ratio (LLR) $\Lambda(n)$, reflecting the likelihood that a detected symbol is a logic "1" or a logic "0";
   b) computing a mean absolute LLR value m for said received frame;
   c) calculating a CRC value for said received frame; and
   d) determining whether said received frame is an erasure, a DTX mode frame or a CONT mode frame based on said CRC value and said mean absolute LLR value.

2. The method of claim 1, wherein step b) comprises determining the absolute value $|\Lambda(n)|$ for all LLRs obtained for said frame, and calculating the mean value m of said absolute LLRs, using the relationship:

$$m = \frac{1}{N+M} \sum_{n=1}^{N+M} |\Lambda(n)|$$

where N is the number of data bits and M is the number of CRC bits in said received frame.

3. The method of claim 1, wherein said step c) comprises: making a hard decision d(n) on each said $\Lambda(n)$, whereby a logic "1" is declared whenever said $\Lambda(n)$ is less than 0, and a logic "0" otherwise; and
calculating said CRC value based on said hard decisions d(n).

4. The method of claim 1, wherein said step d) comprises: establishing a threshold T for said mean absolute LLR value m;
declaring said received frame as a CONT frame if said CRC value indicates a successfully recovered frame, and m>T;
declaring said received frame as a DTX frame if m<T; and
declaring said received frame as an erasure if said CRC value indicates a failed frame, and m>T.

5. A method of detecting the transmission rate of a voice frame in a wireless system comprising:
   a) decoding said voice frame for each of a plurality i of possible transmission rates j(i);
   b) for each said j(i) rate, computing a CRC(i) value and a mean absolute LLR value m(i); and
   c) determining the transmission rate based on said mean absolute LLR value for said voice frame by determining the maximum of all said values m(i); verifying if the CRC(i) value corresponding to said maximum indicates a successful reception of said voice frame; and declaring the rate corresponding to said maximum as said transmission rate.

6. The method of claim 5, further comprising erasing said voice frame if the CRC(i) value corresponding to said maximum indicates a failed reception of said voice frame.

7. The method of claim 5, wherein said transmission rates are a full rate corresponding to full voice activity, an $8^{th}$ rate corresponding to silence, a half rate, and a quarter rate.

8. A receiver for a wireless communication system for recovering information transmitted in a frame, comprising:
   means for decoding a received frame to obtain a log likelihood ratio (LLR) $\Lambda(n)$ value reflecting the likelihood that a detected symbol s(n) is a logic "1" or a logic "0";
   means for computing a mean absolute LLR value m for said received frame;
   means for calculating a CRC value for said received frame; and
   means for determining whether said received frame is an erasure, a discontinuous (DTX) mode frame or a continuous (CONT) mode frame based on the CRC value and said mean absolute LLR value.

9. The receiver of claim 8, wherein said frame is a data frame and said means for decoding comprises a turbo decoder.

10. The receiver of claim 9, wherein said means for computing a mean absolute LLR value comprises means for determining the absolute value $|\Lambda(n)|$ for all LLRs obtained for said frame, and means for calculating the mean value of said absolute value $|\Lambda(n)|$.

11. The receiver of claim 9, wherein said means for calculating a CRC value comprises:
   a hard decision unit for converting each $\Lambda(n)$ value that is less than 0 into a logic decision "1" and converting any other $\Lambda(n)$ value into a logic decision "0"; and
   a CRC unit for calculating a CRC value based on said logic decisions.

12. The receiver of claim 10, wherein said means for calculating the mean value has a transfer function:

$$m = \frac{1}{N+M} \sum_{n=1}^{N+M} |\Lambda(n)|$$

where N is the number of data bits, and M is the number of CRC bits in said received frame.

13. The receiver of claim 8, wherein said frame is a voice frame and said means for decoding comprises an SISO decoder.

14. The receiver of claim 13, wherein said means for decoding comprises:
   a de-interleaver for separating said voice frame from a repeat variant of said voice frame;

decoding means operating at i different rates to provide a respective CRC(i) value and a respective mean absolute LLR value m(i) for each said rate;

a decision logic unit for receiving said CRC(i) values and said m(i) values and determining the rate of said voice frame; and means for establishing operation of said decoding means at said rate.

* * * * *